Dec. 15, 1959  B. V. VLACHOS  2,916,850
COMBINED EDUCATIONAL DEVICE AND TOY
Filed Feb. 10, 1958
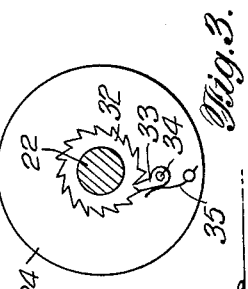
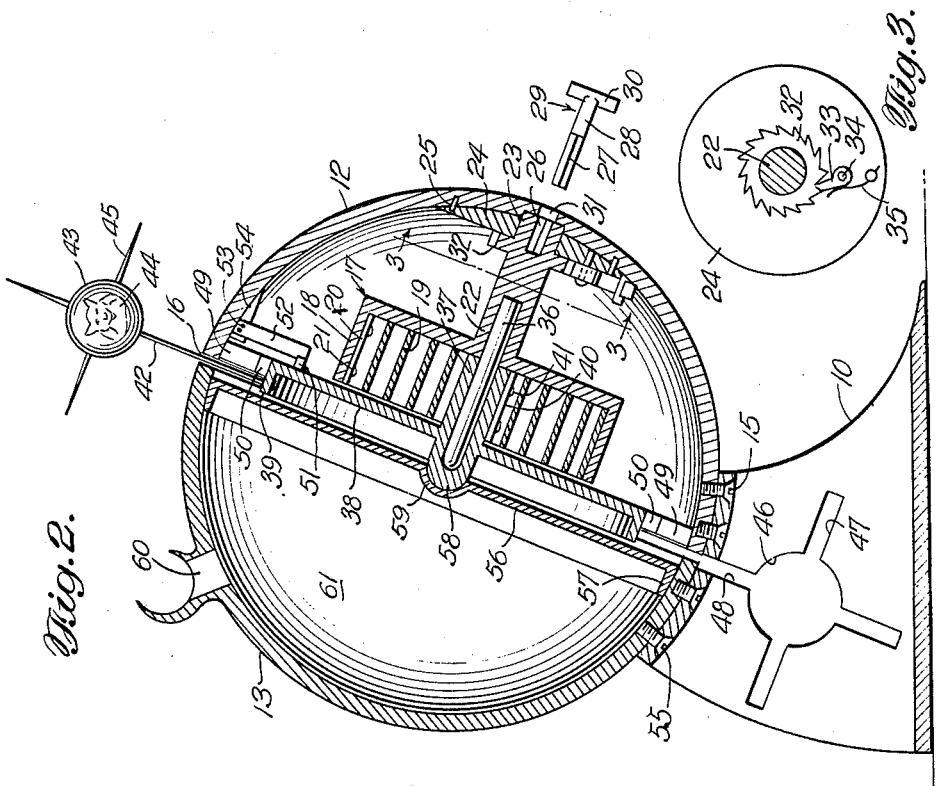
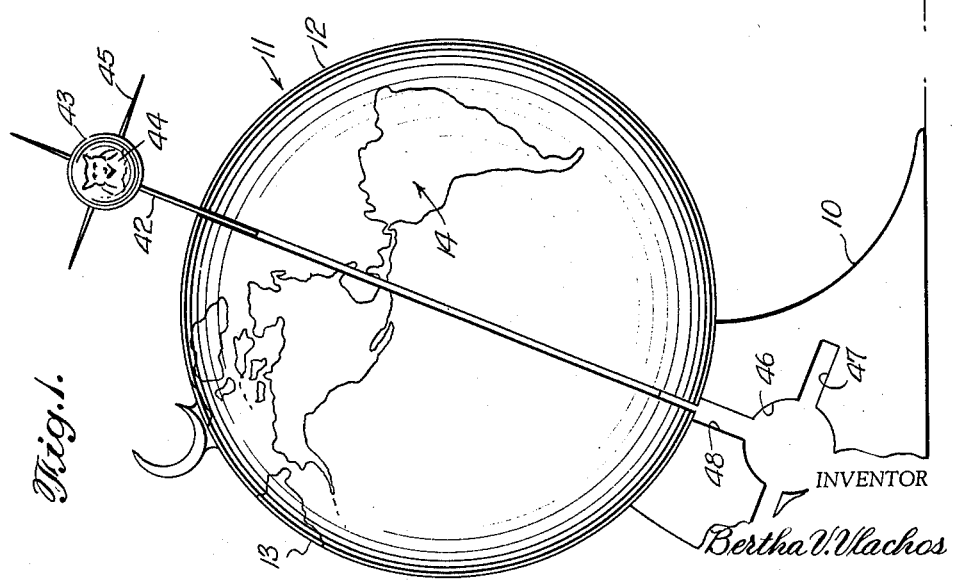
INVENTOR
Bertha V. Vlachos

# United States Patent Office 2,916,850
Patented Dec. 15, 1959

2,916,850
COMBINED EDUCATIONAL DEVICE AND TOY

Bertha V. Vlachos, Washington, D.C.

Application February 10, 1958, Serial No. 714,373

6 Claims. (Cl. 46—118)

This invention relates to education and amusement and more particularly to a combined educational device and toy which serves to provide information as to the shape of the earth, the disposition, size and configuration of the continents of the earth and also serves to illustrate the relationship and movement of an earth satellite in an orbital path around the earth by the provision of a sphere simulating an earth satellite, together with motor means for driving the same in an orbital path around a globe representing the earth. The device also serves as an amusing toy in that, during movement of the satellite around the globe, means is provided for emitting a periodic audible signal and the device likewise incorporates means for providing a coin bank.

It is accordingly an object of the invention to provide a combined educational device and toy including a globe representing the earth, as well as a sphere simulating an earth satellite, together with motor means for driving the sphere in an orbital path around the globe.

A further object of the invention is the provision of a combined educational device and toy including a globe simulating the earth and which may be conveniently constructed of transparent, translucent or opaque plastic or of any other suitable material and having a map of the world applied thereto, such globe being conveniently formed in the shape of two hemispherical shells supported on a base and with motor means contained in one of the shells for moving a sphere for simulating an earth satellite in an orbital path around the globe.

A still further object of the invention is the provsiion of a combined educational device and toy including a globe simulating the earth and serving to house a spring motor for driving a sphere about the earth in an orbital path, thereby simulating the earth satellite, together with means for causing movement of such sphere at a substantially constant speed, as well as means for emitting an audible signal for each revolution of the sphere.

Another object of the invnetion is the provision of a combined educational device and toy including a globe simulating the earth and in which such globe is made up of two hemispherical shells, one shell being fixed to a base and the other shell being removably secured to the base with a removable partition in the other shell and a coin slot to provide a bank.

A further object of the invention is the provision of a combined educational device and toy including a globe simulating the earth and a sphere simulating an earth satellite, together with motor means within the globe for moving the sphere in an orbital path around the globe, such sphere having radially disposed spikes or arms simulating antennae.

A still further object of the invention is the provision of a combined educational device and toy, including a globe simulating the earth and motor means for driving a sphere in an orbital path around the globe thereby simulating an earth satellite, the globe being supported on the base and such globe and base being conveniently and economically constructed by molding, stamping or other equivalent operations to thereby provide a relatively inexpensive device which may be sold in a highly competitive market.

Further objects and advantages of the invention will be apparent from the following description taken in conjunction with the accompanying drawing wherein:

Fig. 1 is an elevational view of a combined educational device and toy constructed in accordance with this invention;

Fig. 2 is a longitudinal sectional view showing the details of construction of the device shown in Fig. 1; and Fig. 3 is a sectional view taken substantially on the line 3—3 of Fig. 2.

With continued reference to the drawing, there is shown a combined educational device and toy constructed in accordance with this invention and which may well comprise a base 10 formed by molding, stamping or any other suitable operation and which may well be formed of plastic or any other suitable material and, of course, may be transparent, translucent or opaque and may be colored or decorated in any desired manner. Supported on the base 10 is a globe 11 simulating the earth and which globe may be formed from two substantially hemispherical shells 12 and 13. The shells 12 and 13 may also be formed of plastic or any other suitable material and may likewise be colored or decorated in any desired manner, but normally a map 14 of the earth would be applied to the shells 12 and 13 in any suitable manner.

As best shown in Fig. 2, the hemispherical shell 12 may be fixed to the base 2 by screw threaded or other suitable fastening means 15 and normally the shell 12 would be permanently fixed to the base 10. As shown, the edge 16 of the shell 12 is disposed in a plane at an angle to the vertical and disposed within the shell 12 is a spring motor 17, the purpose of which will presently appear. The spring motor 17 is provided with a barrel 18 which serves to house a spiral spring 19 with one end 20 of the spring 19 being secured to the barrel 18 by rivets 21 or any othre suitable fastening means. The barrel 18 is provided with a spindle 22 having a bearing portion 23 rotatably mounted in a plate 24 secured to the inner surface of the shell 12 by any suitable fastening means 25 and the outer end of the spindle 22 is provided with a polygonal socket 26 for receiving the polygonal portion 27 on the shank 28 of a winding key 29 which is also provided with a finger engaging portion 30. The key 29 may be inserted through an aperture 31 in the shell 12 in order to engage the socket 26 and turn the spindle 22 to wind the spring 19.

In order to prevent inadvertent unwinding of the spring 19, there may be provided a ratchet 32 on the spindle 12 and a pawl 33 may be pivotally mounted at 34 on the plate 24 with the pawl 33 being urged into engagement with the ratchet 32 by a suitable spring 35 secured to the plate 24. As will be seen from an inspection of Fig. 3, the pawl and ratchet arrangement will permit rotation of the spindle 22 in one direction to wind the spring 19, but will prevent movement of the spindle 22 in the opposite direction.

A shaft 36 may be fixed in the spindle 22 and extend outwardly through the barrel 18 within the spring 19 and the shaft 36 serves to rotatably receive the hub 37 of a disk 38 having an outer peripheral flange 39 projecting outwardly of the edge 16 of the shell 12. The inner end 40 of the spring 19 may be secured to the hub 37 by rivets 41 or any other suitable fastening means.

A rod 42 is secured to the flange 39 of the disk 38 and projects radially outwardly of the shell 12 and secured to the outer end of the rod 42 is a sphere 43 which serves to simulate an earth satellite. The sphere 43 may be made of any suitable material, such as plastic or the like, and if desired, the likeness of a dog 44 may be applied thereto to convey the impression of a dog carrying satellite and also the sphere 43 may be provided with radially projecting spikes or arms 45 which simulate antennae. While a sphere 43 has been shown as simulating an earth satellite, it is to be understood, that this is for illustrative purposes only and that an object of any other shape and of any other size may be employed for this purpose and also the same may be transparent, translucent or opaque or may be colored or decorated in any desired manner.

The base 10 is provided with an opening 46 for receiving and permitting passage of the sphere 43 and radiating from the opening 46 are slots 47 which serve to permit passage of the spikes or arms 45 and a slot 48 communicates with the opening 46 for permitting passage of the rod 42. In order to provide for rotation of the sphere 43 at a substantially constant rate of speed, there may be provided leaf springs 49 secured to the shell 12 having pads 50 of felt or any other suitable material thereon engaging the surface of the flange 39 on the disk 38 in order to provide a brake which will cause the disk 38 to rotate at a substantially constant speed.

Since it is customary for artificial earth satellites to emit radial signal of a certain audio frequency in order to simulate such a signal there may be provided a projection 51 on the disk 38 and disposed in the path of projection 51 may be disposed a reed 52 of metal or any other suitable material and which may be tuned to any desired audio frequency, the reed 52 being mounted in any suitable way on the shell 12, as by fastening means 53 securing the reed 52 to a boss 54 molded on the inner surface of the shell 12. Thus, for each revolution of the disk 38 and sphere 43, the projection 51 will actuate the reed 52 to provide an audible signal thus indicating that the satellite has made one revolution around the earth.

The hemispherical shell 13 may be removably secured to the base 10 by screw threaded or other suitable fastening means 55 and as will be seen, the shell 13 is spaced from the shell 12 in order to provide an annular slot for receiving the rod 42 supporting the sphere 43. This annular slot is, of course, in line with the slot 48 in the base 10 in order to permit a complete revolution of the sphere 43 around the globe 11.

A removable partition 56 may be provided in the shell 13 and the partition 56 may be provided with an annular flange 57 engaging the inner surface of the shell 13 and the partition 56 may be held in place by a boss 58 on the hub of the disk 38 engaging a depression 59 in the partition 56. A coin slot 60 may be provided in the wall of the shell 13 in order to permit the insertion of coins into the space 61 provided by the shell 13 and the partition 56. When it is desired to remove coins from the space 61, it is only necessary to remove the shell 13 from the base 10 by removal of the fastening means 55, at which time the partition 56 may be removed in order to permit access to the space 61 and removal of coins therefrom.

While a spring motor for driving the sphere 43 has been shown by way of illustration, it is, of course, to be understood, that an electric motor or any other suitable power means may be employed for this purpose and likewise the brake means for providing a constant speed of movement of the sphere 43 may be replaced by other suitable means, such as an escapement or a governor which may be utilized in a conventional manner at a constant speed of rotation for the disk 38.

It will be seen that by the above described invention there has been provided a relatively simple and inexpensive combined educational device and toy which will provide information as to the movement of an earth satellite about the earth, together with an audible signal indicating each rotation of the earth satellite and also providing a coin bank which serves to enhance the amusement aspect of the device.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A combined educational device and toy comprising a base, a substantially hemispherical shell fixed to said base with the edge of said shell in a plane disposed at an angle to the vertical, a spring motor mounted in said shell, a rotatably mounted disk disposed substantially in the plane of the edge of said shell, means providing a driving connection between said motor and said disk, a rod secured to said disk and projecting radially outwardly of said shell, a second substantially hemispherical shell removably secured to said base in spaced confronting relation to said first shell to provide a globe having a continuous annular slot receiving said rod, a map of the world on said globe, a sphere fixed to the outer end of said rod and simulating an ear satellite, a likeness of a dog in said sphere, radially disposed spikes on said sphere simulating antennae, an opening in said base in alignment with said slot to permit passage of said sphere and brake means engaging said disk to limit the speed of rotation thereof, whereby upon operation of said motor said sphere will move around said globe in an orbital path.

2. A combined educational device and toy comprising a base, a substantially hemispherical shell fixed to said base with the edge of said shell in a plane disposed at an angle to the vertical, a spring motor mounted in said shell, a rotatably mounted disk disposed substantially in the plane of the edge of said shell, means providing a driving connection between said motor and said disk, a rod secured to said disk and projecting radially outwardly of said shell, a second substantially hemispherical shell removably secured to said base in spaced confronting relation to said first shell to provide a globe having a continuous annular slot receiving said rod, a map of the world on said globe, a sphere fixed to the outer end of said rod and simulating an earth satellite, radially disposed spikes on said sphere simulating antennae, an opening in said base in alignment with said slot to permit passage of said sphere and brake means engaging said disk to limit the speed of rotation thereof, whereby upon operation of said motor said sphere will move around said globe in an orbital path.

3. A combined educational device and toy comprising a base, a substantially hemispherical shell fixed to said base with the edge of said shell in a plane disposed at an angle to the vertical, a motor mounted in said shell, a rotatably mounted disk disposed substantially on the plane of the edge of said shell, means providing a driving connection between said motor and said disk, a rod secured to said disk and projecting radially outwardly of said shell, a second substantially hemispherical shell removably secured to said base in spaced confronting relation to said shell to provide a globe having a continuous annular slot receiving said rod, a map of the world on said globe, a sphere fixed to the outer end of said rod and simulating an earth satellite, radially disposek spikes on said sphere simulating antennae, an opening in said base in alignment with said slot to permit passage of said sphere and brake means engaging said disk to limit the speed of rotation thereof, whereby upon operation of said motor said sphere will move around said globe in an orbital path.

4. A combined educational device and toy comprising a base, a substantially hemispherical shell fixed to said base with the edge of said shell in a plane disposed at an angle to the vertical, a motor mounted in said shell, a rotatably mounted disk disposed substantially in the plane of the edge of said shell, means providing a driving connection between said motor and said disk, a rod secured to said disk and projecting radially outwardly of said shell, a second substantially hemispherical shell removably secured to said base in spaced confronting relation to said first shell to provide a globe having a continuous annular slot receiving said rod, a map of the world on said globe, a sphere fixed to the outer end of said rod and simulating an earth satellite, an opening in said base in alignment with said slot to permit passage of said sphere and brake means engaging said disk to limit the speed of rotation thereof, whereby upon operation of said motor said sphere will move around said globe in an orbital path.

5. A combined educational device and toy comprising a base, a substantially hemispherical shell fixed to said base, a motor mounted in said shell, a rotatably mounted disk disposed substantially in the plane of the edge of said shell, means providing a driving connection between said motor and said disk, a rod secured to said disk and projecting radially outwardly of said shell, a second substantially hemispherical shell removably secured to said base in spaced confronting relation to said first shell to provide a globe having a continuous annular slot receiving said rod, a sphere fixed to the outer end of said rod and simulating an earth satellite, an opening in said base in alignment with said slot to permit passage of said sphere and brake means engaging said disk to limit the speed of rotation thereof, whereby upon operation of said motor said sphere will move around said globe in an orbital path.

6. A combined educational device and toy as defined in claim 5 in which a projection is provided on said disk and a tuned reed mounted in said first shell in the path of movement of said projection serves to provide an audible signal for each revolution of said sphere.

References Cited in the file of this patent

UNITED STATES PATENTS

| | | |
|---|---|---|
| 465,824 | Moore | Dec. 22, 1891 |
| 1,018,625 | Long | Feb. 27, 1912 |
| 1,659,810 | Damoff | Feb. 21, 1928 |
| 2,204,952 | Wittigschlager | June 18, 1940 |
| 2,283,585 | Singer | May 19, 1942 |
| 2,434,250 | Rebus | Jan. 13, 1948 |

FOREIGN PATENTS

| | | |
|---|---|---|
| 194,420 | Germany | Jan. 21, 1908 |